United States Patent [19]
Honda et al.

[11] Patent Number: 5,281,327
[45] Date of Patent: Jan. 25, 1994

[54] METHOD OF PRODUCING CONDUCTIVE POLYMER COMPOSITES

[75] Inventors: Satoshi Honda; Hideaki Matsuura, both of Niihama, Japan

[73] Assignee: Sumitomo Chemical Company, Limited, Osaka, Japan

[21] Appl. No.: 28,166

[22] Filed: Mar. 9, 1993

[30] Foreign Application Priority Data

Mar. 10, 1992 [JP] Japan .................. 4-051363

[51] Int. Cl.⁵ .............................. C25D 9/02
[52] U.S. Cl. ...................... 205/198; 205/317; 204/78
[58] Field of Search .......... 205/198, 317; 204/78

[56] References Cited

U.S. PATENT DOCUMENTS

| | | | |
|---|---|---|---|
| 4,468,291 | 8/1984 | Naarmann et al. | 204/78 |
| 4,699,804 | 10/1987 | Miyata et al. | 437/176 |
| 5,126,017 | 6/1992 | Nakawa et al. | 205/78 |

FOREIGN PATENT DOCUMENTS

| | | |
|---|---|---|
| 0144127 | 6/1985 | European Pat. Off. . |
| 3742 | 1/1986 | Japan . |
| 126140 | 6/1986 | Japan . |
| 174399 | 7/1987 | Japan . |

OTHER PUBLICATIONS

Chemistry Letters, No. 6, Jun. 1987, pp. 1239–1242.

*Primary Examiner*—John Niebling
*Assistant Examiner*—Kishor Mayekar
*Attorney, Agent, or Firm*—Sughrue, Mion, Zinn, Macpeak & Seas

[57] ABSTRACT

Disclosed is a method of producing a conductive polymer composite comprising a resin layer and a conductive polymer layer formed on the resin layer, which comprises the steps of dissolving, in a monomer component (a) which is polymerizable without condensation reaction, a monomer component (b) capable of undergoing electrolytic polymerization to give at least one conductive polymer and an electrolyte (c), introducing the resulting solution into an electrolytic polymerization cell, applying a direct current voltage across the cell to electrolytically polymerize the component (b) to thereby provide the conductive polymer layer, and thereafter subjecting the component (a) to polymerization in the cell to provide the resin layer.

16 Claims, 1 Drawing Sheet

METHOD OF PRODUCING CONDUCTIVE POLYMER COMPOSITES

FIELD OF THE INVENTION

The present invention relates to a method of producing electrically conductive polymer composites.

PRIOR ART

Heretofore a number of proposals have been made for the production of a composite comprising a general-purpose resin and an electrically conductive polymer. By way of illustration, Japanese Unexamined Patent Publication (Kokai) No. 157522/1986 teaches a technology for depositing an electrically conductive polymer layer on the surface of a general-purpose resin which comprises contacting a general-purpose resin containing an oxidizing agent with a solution or vapor of a monomer having the property to form a conductive polymer on oxidative polymerization.

Japanese Unexamined Patent Publication (Kokai) No. 105532/1985 discloses a technology for producing a conductive polymer composite which comprises carrying out an electrolysis using an anode coated with a general-purpose resin and a cathode in an electrolyte solution containing a monomer capable of providing a conductive polymer on electrolytic polymerization to thereby produce a conductive polymer in said general-purpose resin.

Japanese Unexamined Patent Publication (Kokai) No. 3742/1986 discloses a technology for producing a conductive polymer composite which comprises impregnating a sheet of general-purpose resin with an electrolytically polynerizable monomer solution and conducting an electrolytic polymerization reaction using a pair of electrodes abutted against both sides of the sheet.

However, the technology described in Japanese Unexamined Patent Publicaiton (Kokai) No. 157522/1986 is disadvantageous in that it is difficult to control the conductive polymer content and thickness of the conductive polymer layer. By the technology taught by Japanese Unexamined Patent Publication (Kokai) No. 105532/1985, only composites in film form can be manufactured and it is difficult to impart sufficient electrical conductivity to a surface of the thick general-purpose resin product. The technology according to Japanese Unexamined Patent Publication (Kokai) No. 3742/1986, wherein a sheet of general-purpose resin is impregnated with an electrolytically polymerizable monomer solution, is disadvantageous in that the starting resin sheet must, for example, be provided with adequate porosity beforehand but such treatment sacrifices the intrinsic mechanical strength and other characteristics of the general-purpose resin.

SUMMARY OF THE INVENTION

An object of the present invention is to provide a novel technology for producing a general-purpose resin-conductive polymer composite without detracting from the inherent mechanical and other desirable characteristics of general-purpose resin, which technology allows the production of conductive composites in various shapes with a great freedom of choice in the thickness of the conductive layer.

The present invention provides a method of producing an electrically conductive polymer composite comprising a resin layer and a conductive polymer layer formed on the resin layer, which comprises the steps of dissolving, in a monomer component (a) which is polymerizable without condensation reaction, a monomer component (b) capable of undergoing electrolytic polymerization to provide at least one conductive polymer and an electrolyte (c), introducing the resulting solution into an electrolytic polymerization cell, applying a direct current voltage across said cell to electrolytically polymerize component (b) to thereby provide the conductive polymer layer, and thereafter subjecting said component (a) to polymerization in said cell to provide the resin layer.

DETAILED DESCRIPTION OF THE INVENTION

The conductive polymer composite according to the present invention comprises a layer of general-purpose resin formed by polymerization of said monomer (a) which is polymerizable without condensation reaction and a conductive polymer layer formed by electrolytic polymerization of said monomer component (b), said conductive polymer layer being formed on the surface of said general-purpose resin layer.

The thickness each of the general-purpose resin layer and the electrically conductive polymer layer can be selected from a wide range, and the ratio of the thickness of one layer to that of the other layer is not particularly limited. Generally, it is preferable that the thickness of the conductive polymer layer to the thickness of the resin layer ranges from about 0.0000001 to about 1.

The method according to the present invention is schematically illustrated in FIGS. 1 through 3.

One preferred embodiment of the invention for the production of the conductive polymer composite is now described with reference to the accompanying drawings. First, said monomer component (a) (containing a catalyst, initiator or curing agent), monomer component (b), and component (c) and if desired a solvent of component (c) are admixed to prepare an electrolysis solution.

Figure 1:
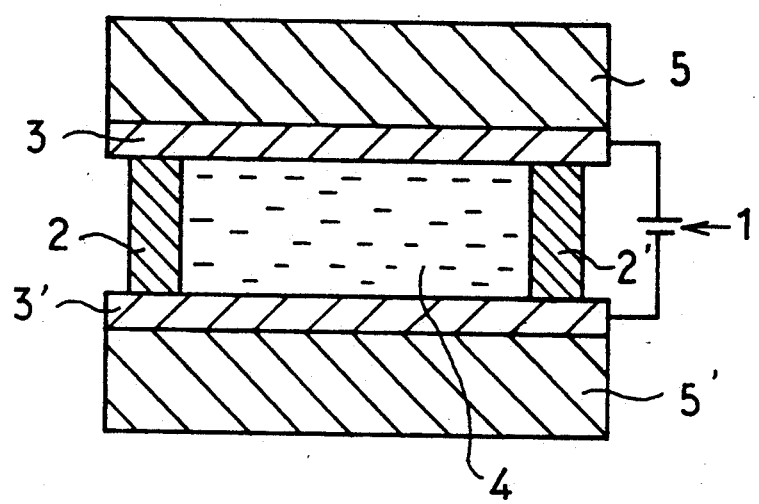
FIG. 1 shows the electrolytic polymerization cell filled with the electrolysis solution.
Figure 2:
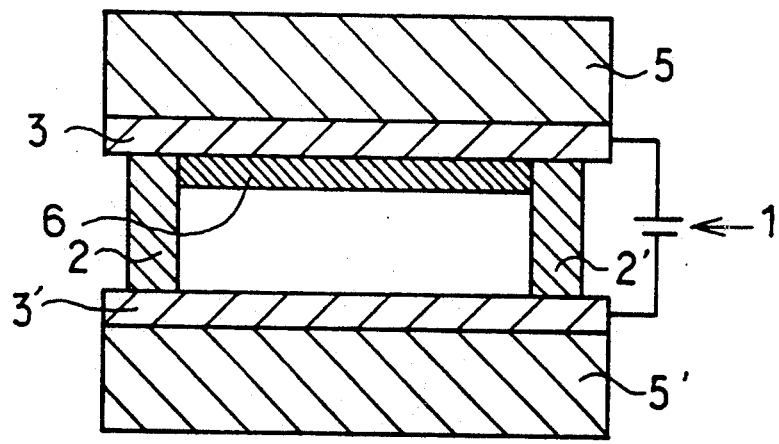
FIG. 2 shows the status on completion of electrolytic polymerization.

An electrolytic polymerization cell is then filled with the solution 4 as shown in FIG. 1. Thereafter, using a direct current source 1, a direct current is passed between a working electrode 3 and a counter electrode 3' for conducting the electrolytic polymerization of component (b). By this procedure, the component (b) is electrolytically polymerized to provide a uniform conductive polymer layer 6 on the surface of the working electrode 3. If component (b) comprises two or more kinds of monomers, each of which is polymerized under different electrolytic polymerization conditions, at least two conductive polymer layers can be formed.

The electrolytic polymerization cell is then subjected to conditions causing polymerization of component (a) to polymerize the component (a). In this manner, a layer of the polymer produced by the polymerization of component (a) is formed in intimate contact with said conductive polymer layer 6 to give the conductive polymer composite of the invention.

Figure 3:
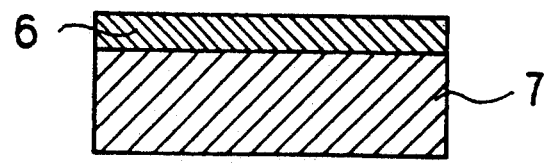
FIG. 3 shows the product conductive polymer composite.

Then, the electrolytic polymerization cell is disassembled to take out the conductive polymer composite comprising a resin layer 7 and a conductive polymer layer 6 formed on said resin layer 7, as illustrated in FIG. 3.

The monomer polymerizable without condensation reaction, which constitutes the component (a) of the invention, is a monomer which forms a polymer without release of a low molecular species in the course of polymerization, such as one capable of being polymerized by addition polymerization, polyaddition, cyclopolymerization, isomerization polymerization, ring-opening polymerization and so on.

Typical examples of such monomer component (a) include addition-polymerizable monomers such as methacrylic esters, particularly $C_1$-$C_{20}$ alkyl esters, acrylic esters, particularly $C_1$-$C_{20}$ alkyl esters, styrene, vinyl acetate, vinyl chloride, vinylidene chloride, vinylidene fluoride and derivatives thereof, etc., mixtures of polyols with polyisocyanates, which are used in the production of urethane resins, and glycidyl compounds, which are used in the production of epoxy resins. Preferred, among these monomers, is one or more members selected from the group consisting of said acrylic esters and methacrylic esters, or a mixture comprising more than 50 weight %, preferably more than 70 weight %, but less than 100 weight % of at least one member selected from the group consisting of said acrylic esters and methacrylic esters and the balance of one or more other addition-polymerizable monomers as mentioned above.

The component (a) is used as previously supplemented with a catalyst, initiator or curing agent suitable for the polymerization or curing of the same. As the catalyst, initiator and curing agent, any reagents that are conventionally used can be employed. By way of illustration, when said addition-polymerizable monomer is used as component (a), the initiator that can be employed includes azo compounds such as azobisisobutyronitrile or azobisisovaleronitrile, organic peroxides such as lauroyl peroxide or t-butyl peroxy-2-ethylhexanoate, inorganic peroxides such as $K_2S_2O_8$, and so on. When a polyol and a polyisocyanate are used as component (a), the curing agent that can be employed includes tin compounds such as dibutyltin dimaleate, dibutyltin thiocarboxylate, and so on. When a glycidyl compound is employed, the catalyst may for example be acid anhydrides such as maleic anhydride, dicyandiamide, amines such as ethylenediamine or m-phenylenediamine, for instance.

The component (a) may further contain one or more additives such as coloring agents, light diffusers, reinforcing agents, fillers, parting agents, stabilizers, ultraviolet absorbers, antioxidants, antistatic agents, flame retardants, etc. where necessary.

The monomer (b) capable of undergoing electrolytic polymerization to provide a conductive polymer is a compound which is soluble in monomer (a) and capable of being polymerized upon oxidation or reduction to form an electrically conductive polymer. As examples of such monomer, there can be mentioned five-membered heterocyclic compounds such as pyrrole, thiophene, furan, selenophene, tellurophene, isothianaphthene, etc. and derivatives thereof, especially those having 1 to 3, particularly 1 to 2, substituents selected from the group consisting of a $C_1$-$C_{30}$ alkyl group, a halogen atom, a hydroxyl group, a carboxyl group, a $C_1$-$C_{30}$ alkyleneoxide group, a $C_1$-$C_{30}$ hydroxyalkyl group, a $C_1$-$C_{30}$ alkylsulfonic acid group and a $C_1$-$C_{30}$ alkylsulfonic acid salt (such as an alkali metal salt) group; and aromatic compounds such as benzene, biphenyl, naphthalene, anthracene, azulene, pyrene, carbazole, pyridazine, aniline, etc. and derivatives thereof, especially those having 1 to 4, particularly 1 to 2, substituents selected from the group consisting of a $C_1$-$C_{30}$ alkyl group, a halogen atom, a hydroxyl group, a carboxyl group, a $C_1$-$C_{30}$ alkyleneoxide group, a $C_1$-$C_{30}$ hydroxyalkyl group, a $C_1$-$C_{30}$ alkylsulfonic acid group and a $C_1$-$C_{30}$ alkylsulfonic acid salt (such as an alkali metal salt) group. These monomers can be used alone or in combination. When two or more kinds of the monomers, each of which is polymerized under conditions different from one another, are used as component (b), two- or multi-layered conductive polymer layer can be formed. Preferred are said 5-membered heterocyclic compounds and derivatives thereof. Particularly preferred are pyrrole and its derivatives such as a $C_1$-$C_{30}$ alkyl-substituted pyrrole.

Component (b) is used in an amount effective for giving a conductive polymer layer having the desired area and thickness.

Component (b) is used as dissolved in component (a). There is not a particular restriction on the amount of component (b) so far as a conductive polymer layer can be formed. Generally, it is preferable to use about 0.0000001 to 1 part by weight per part by weight of component (a).

The electrolyte used as component (c) of the invention is an electrolyte soluble in component (a), and includes those conventionally used for electrolytic polymerization of component (b), such as inorganic ion salts such as $LiClO_4$, $LiBF_4$, $LiCF_3SO_3$, $LiPF_6$, $LiAsF_6$, $AgClO_4$, etc., protonic acid salts such as sodium alkylsulfonate, particularly $C_1$-$C_{20}$ alkylsulfonate, sodium alkylbenzenesulfonate, particularly ($C_1$-$C_{20}$ alkyl)benzenesulfonate, etc., organic quaternary ammonium salts such as $(C_2H_5)_4NClO_4$ etc., polymer salts such as sodium polymethacrylate, etc., protonic acids, esters, and other compounds. These electrolytes can be used alone or in combination.

The amount of component (c) per 1 kg of component (a) is preferably about 0.0001 to 10 moles and more preferably about 0.001 to 1 mole, although the amount may be variable over a wide range.

The above components (a), (b) and (c) are mixed together to form a solution, which is then introduced into an electrolytic polymerization cell.

Optionally, a solvent for component (c) can be added as an electrolysis accelerator to said solution of (a), (b) and (c). This solvent can be any solvent that is capable of dissolving component (c) and evenly miscible with the solution of (a), (b) and (c). Thus, for example, glymes such as ethylene glycol dimethyl ether, diethylene glycol dimethyl ether, triethylene glycol dimethyl ether, tetraethylene glycol dimethyl ether, etc., glycols such as ethylene glycol, diethylene glycol, polyethylene glycol, propylene glycol, polypropylene glycol, etc., propylene carbonate, ethylene carbonate, formamide, dimethylformamide, dimethylacetamide, N-methylpyrrolidone, tetramethylurea, dimethyl sulfoxide, acetonitrile, methanol, ethanol, water, etc. may be mentioned. These solvents can be used singly or in combination. When the solvent is employed, its amount is less than about 100 parts by weight, preferably about 0.001 to 100 parts by weight, per 100 parts by weight of component (a), since the use of a solvent in an increased amount tends to sacrifice the mechanical strength and other characteristics of the product conductive polymer composite, the proper amount should be selected according to the intended application.

The electrolytic polymerization cell to be employed in the method of the invention is a mold having an internal configuration or cavity capable of giving the desired shape to the final conductive polymer composite. The cell is internally equipped with a working electrode configured to provide a conductive layer of the desired shape and with a counter electrode, and can be subjected to heating, cooling or ultraviolet irradiation which is required for the polymerization or curing of said component (a).

A preferred example of the electrolytic polymerization cell is illustrated in FIG. 1, which shows a crosssectional view of the cells. This cell comprises a frame plate 5, an electrode 3 formed on one side of said frame plate 5, another frame plate 5', an electrode 3' formed on one side of said frame plate 5', and gaskets 2 and 2' interposed between said electrodes 3 and 3'. The cavity defined by said electrodes 3 and 3' and gaskets 2 and 2' is adapted to accept an electrolysis solution containing said monomer component (a) (including the catalyst, initiator or curing agent), monomer component (b), component (c) and optionally the solvent for component (c) and additives. The end sides of the cell are closed with a gasket similar to said gaskets 2 and 2'.

The configuration or shape and size of elecrodes 3 and 3' and the distance between electrodes 3 and 3' can be freely selected according to the desired product shape, size and thickness so that a composite having any desired shape can be successfully fabricated by the method of this invention.

Generally speaking, there is no particular limitation the size and shape of electrodes 3 and 3' and the distance between electrodes 3 and 3' insofar as an electrically conductive polymer layer can be formed.

The material for the electrodes is not critical, only if it is electrically conductive and resistant to corrosion. Examples of said material include various metals such as stainless steel, copper, aluminum, platinum, gold, palladium, etc., and conductive metal oxides such as tin oxide, indium oxide, etc. These materials may be used as deposited on a substrate, such as a plate made of glass, a metal, ceramics or a synthetic resin, by a suitable technique such as vapor deposition, sputtering and so on.

For the electrolytic polymerization of component (b), a direct current voltage is applied to the electrolytic polymerization cell. When the component (b) is a monomer which yields a conductive polymer on oxidation, a conductive polymer layer is formed on the anode. Conversely, when the component (b) is a monomer which yields a conductive polymer on reduction, a conductive polymer film is formed on the cathode. The DC potential to be applied is preferably about 1 mV to 100 V, particulartly a few mV to tens of V. The current density and electrolytic polymerization time are dependent on the desired thickness of the conductive polymer layer, provided that species of components (a), (b) and (c) and their ratio are unchanged.

The thickness of the conductive polymer layer depends on the intended use of the composite, among other factors, but generally is preferably selected from the range of about 0.001 $\mu$m to about 1 mm.

The current density and electrolytic polymerization time are set in such a manner that the quantity of electricity is increased when a greater thickness of conductive polymer layer is desired while it is decreased when a thinner conductive polymer layer is sufficient.

Generally speaking, this electrolytic polymerization is preferably carried out at a current density of about 0.00001 to 1000 mA/cm$^2$, preferably about 0.0001 to 100 mA/cm$^2$.

Once the correlation between the quantity of electricity and the thickness of the conductive polymer layer to be formed on a given monomer-contacting surface of the electrode is experimentally determined, the time required for electrolytic polymerization can be easily estimated.

It should be noted that after the electrolytic polymerization reaction, the component (b) in the solution may have been completely consumed or be remaining partially unconsumed and dissolved or suspended in the component (a) and/or said solvent.

After completion of the above electrolytic polymerization, the component (a) in the cell is polymerized. This polymerization method is not an extraordinary one but can be carried out by any method well-known for the polymerization of component (a).

At the stage of completion of the electrolytic polymerization of component (b), the component (a) remains unpolymerized in the reaction mixture as mentioned above. Therefore, by subjecting the cell containing the reaction mixture to conventional polymerization conditions, the component (a) is polymerized.

For example, when said addition-polymerizable monomer is used as component (a), a radical polymerization reaction, for instance, depending on the initiator or catalyst used, is carried out at a temperature effective for conducting the polymerization of the particular species of component (a), generally at about 0° to 150° C.

When said polyol and polyisocyanate are used as component (a), the polymerization reaction is carried out at a temperature effective for the polyaddition of the two substances, for example about 0° to 100° C., which depends on the catalyst used.

When said glycidyl compound is used as component (a), the curing reaction is preferably carried out generally at room temperature to 100° C.

When UV irradiation is used for polymerization or curing, sufficient amount of irradiation is used.

Following the above polymerization of component (a), the cell is disassembled to take out the product conductive polymer composite.

Thus, in accordance with the present invention, electrically conductive composites can be manufactured without sacrificing the inherent characteristics of general-purpose resins. Moreover, the method of the invention provides conductive polymers composites in a diversity of shapes and sizes and permits free control of the thickness of the conductive polymer layer through modulation of the amount of component (b), the current density and electrolytic polymerization time, i.e., the quantity of electricity.

The conductive polymer composite of the present invention finds application as material for destaticizers, electromagnetic shields, electrodes and so on.

EXAMPLES

The following examples are intended to describe the present invention in further detail and should by no means be construed as limiting the scope of the invention.

The evaluation parameters mentioned in the examples were determined by the following methods.

The surface resistivity of the conductive polymer composites was measured by the two-probe technique using Custom digital multimeter MODEL CDM-200.

As mechanical strength parameters, flexural strength and flexural modulus were measured in accordance with JIS K7203.

The thickness of the conductive polymer layer was measured with ERICHSEN GMBH & COKG's paint inspection gage P.I.G455.

Example 1

In 0.1 liter of methyl methacrylate were dissolved 0.01 mole of LiClO$_4$, 0.005 mole of pyrrole and 0.5 mmole of azobisisobutyronitrile. This solution was introduced into an electrolytic polymerization cell (as shown in FIG. 1) comprising a couple of ITO/glass electrodes (i.e., indium tin oxide (ITO)-clad glass plates (12 cm×12 cm) having a surface resistivity of 100 Ω) and 3 mm-thick PVC gaskets interposed between the electrodes, and an electrolytic polymerization reaction was conducted by applying a direct current voltage of 10 V to the ITO/glass electrodes for 5 minutes using a direct current source (MODEL GPR-1830, product of GOODWILL INSTRUMENT CO., LTD.), wherein the current density was adjusted to 0.17 mA/cm$^2$ at the initial stage and then gradually decreased to reach 0.13 mA/cm$^2$ at the final stage.

The electrolytic polymerization cell was then immersed in a water bath at 75° C. for 3 hours and in an air bath at 120° C. for 1 hour for effecting the radical polymerization of methyl methacrylate. Finally, the cell was disassembled to provide a polymethyl methacrylate polypyrrole composite having a thickness of 3 mm.

The thickness of the polyprrole layer was 1.5 μm. The conductive polymer composite showed a surface resistively of 1.4×10$^5$ Ω, a flexural strength of 1320 kgf/cm$^2$ and a flexural modulus of 34000 kgf/cm$^2$.

Example 2

A 3 mm-thick polymethyl methacrylate-polypyrrole composite was prepared in the same manner as in Example 1 except that 0.01 mole of LiBF$_4$ was used in lieu of 0.01 mole of LiClO$_4$ and that the current density for the electrolytic polymerization was adjusted to 0.14 mA/dm$^2$ at the initial stage and then gradually decreased to reach 0.10 mA/cm$^2$ at the final stage. The thickness of the polypyrrole layer was 1.3 μm. The conductive polymer composite had a surface resistivity of 6.0×10$^4$ Ω, a flexural strength of 1250 kgf/cm$^2$ and a flexural modulus of 33600 kgf/cm$^2$.

Example 3

A 3 mm-thick polymethyl methacrylate-polypyrrole composite was prepared in the same manner as in Example 1 except that 0.01 mole of LiCF$_3$SO$_3$ was used in lieu of 0.01 mole of LiClO$_4$ and that the current density for the electrolytic polymerization was adjusted to 0.14 mA/cm$^2$ and at the initial stage and then gradually decreased to reach 0.10 mA/cm$^2$ at the final stage. The thickness of the polypyrrole layer was 1.3 μm. The conductive polymer composite had a surface resistivity of 1.0×10$^5$ Ω, a flexural strength of 1280 kfg/cm$^2$ and a flexural modulus of 33800 kgf/cm$^2$.

Example 4

A 3 mm-thick polymethyl methacrylate-polypyrrole composite was prepared in the same manner as in Example 1 except that stainless steel electrodes were used in lieu of the ITO/glass electrodes and that the current density for the electrolytic polymerization was adjusted to 0.35 mA/cm$^2$ at the initial stage and then gradually decreased to reach 0.26 mA/cm$^2$ at the final stage. The thickness of the polypyrrole layer was 3.0 μm. The conductive polymer composite had a surface resistivity of 1.4×10$^5$ Ω, a flexural strength of 1320 kgf/cm$^2$ and a flexural modulus of 33000 kgf/cm$^2$.

Example 5

A 3 mm-thick polymethyl methacrylate-polythiophene composite was prepared in the same manner as in Example 1 except that 0.005 mole of thiophene was used in lieu of 0.005 mole of pyrrole and that the electrolytic polymerization was carried out at 20 V for 5 minutes wherein the current density was adjusted to 0.31 mA/cm$^2$ at the initial stage and then gradually decreased to reach 0.24 mA/cm$^2$ at the final stage.

The conductive polymer composite had a surface resistivity of 5.0×10$^9$ Ω, a flexural strength of 1300 kgf/cm$^2$ and a flexural modulus of 33000 kgf/cm$^2$.

Example 6

A 3 mm-thick polymethyl methacrylate-poly(N-methylpyrrole) composite was prepared in the same manner as in Example 1 except that 0.005 mole of N-methylpyrrole was used in lieu of 0.005 mole of pyrrole and that the electrolytic polymerization was carried out at 10 V for 5 minutes wherein the current density was adjusted to 0.17 mA/cm$^2$ at the initial stage and then gradually decreased to reach 0.13 mA/cm$^2$ at the final stage.

The conductive polymer composite had a surface resistivity of 2.5×10$^9$ Ω, a flexural strength of 1270 kgf/cm$^2$ and a flexural modulus of 33200 kgf/cm$^2$.

Example 7

A 5 mm-thick polymethyl methacryalte-polypyrrole composite was produced in the same manner as in Example 1 except that 0.2 liter of methyl methacrylate, 0.02 mole of LiClO$_4$, 0.01 mole of pyrrole and 1 mmole of azobisisobutyronitrile were used, that 5 mm-thick PVC gaskets were employed, that the current density for the electrolytic polymerization was adjusted to 0.17 mA/cm$^2$ at the initial stage and then gradually decreased to reach 0.13 mA/cm$^2$ at the final stage, and that the radical polymerization was conducted in a water bath at 60° C. for 7 hours and in an air bath at 120° C. for 1 hour.

The thickness of the polypyrrole layer was 1.5 μm. The conductive polymer composite had a surface resistivity of 5×10$^5$ Ω, a flexural strength of 1250 kgf/cm$^2$ and a flexural modulus of 34000 kgf/cm$^2$.

Example 8

A 10 mm-thick poymethyl methacrylate-polypyrrole composite was produced in the same manner as in Example 1 except that 0.4 liter of methyl methacrylate, 0.04 mole of LiCLO$_4$, 0.02 mole of pyrrole and 2 mmoles of azobisisobutyronitrile were used, that the thickness of PVC gaskets was increased to 10 mm, that the current density for the electrolytic polymerization was adjusted to 0.17 mA/cm$^2$ at the initial stage and then gradually decreased to reach 0.13 mA/cm² at the final stage, and that the radical polymerization wad conducted in a water bath at 40° C. for 10 hours, at 60° C. for 5 hours and at 80° C. for 5 hours and in an air bath at 120° C. for 1 hour.

The thickness of the polypyrrole layer was 1.5 μm. The conductive polymer composite had a surface resistivity of $1.2 \times 10^6$ Ω, a flexural strength of 1200 kgf/cm² and a flexural modulus of 34000 kgf/cm².

Example 9

A 3 mm-thick methyl methacrylate-polypyrrole composite was prepared in the same manner as in Example 1 except that the electrolytic polymerization reaction was conducted for 3 minutes wherein the current density was adjusted to 0.17 mA/cm² at the initial stage and then gradually decreased to reach 0.14 mA/cm² at the final stage.

The thickness of the polypyrrole layer was 1 μm. The conductive polymer composite had a surface resistivity of $3 \times 10^5$ Ω, and the composite had a flexural strength of 1300 kgf/cm² and a flexural modulus of 34000 kgf/cm².

Example 10

A 3 mm-thick polymethyl methacrylate-polypyrrole composite was prepared in the same manner as in Example 1 except that the electrolytic polymerization was conducted for 10 minutes wherein the current density was adjusted to 0.17 mA/cm² at the initial stage and then gradually decreased to reach 0.10 mA/cm² at the final stage.

The thickness of the polypyrrole layer was 3 μm. The conductive polymer composite had a surface resistively of $2.5 \times 10^4$ Ω, a flexural strength of 1300 kgf/cm² and a flexural modulus of 34000 kgf/cm².

Example 11

A 3 mm-thick methyl methacrylate-polypyrrole composite was prepared in the same manner as in Example 1 except that 0.24 ml of water was added to the solution and that the electrolytic polymerization was conducted at a voltage of 8 V wherein the current density was adjusted to 0.1 mA/cm² at the initial stage and then gradually decreased to reach 0.08 mA/cm² at the final stage.

The thickness of the polypyrrole layer was 1 μm. The conductive polymer composite had a surface resistivity of $8.5 \times 10^4$ Ω, a flexural strength of 1140 kgf/cm² and a flexural modulus of 35600 kgf/cm².

Example 12

A 3 mm-thick polymethyl methacrylate-polypyrrole composite was prepared in the same manner as in Example 1 except that 3.6 ml of acetonitrile was added to the solution and that the electrolytic polymerization was conducted at a voltage of 6 V wherein the current density was adjusted to 0.1 mA/cm² at the initial stage and then gradually decreased to reach 0.08 mA/cm² at the final stage.

The thickness of the polypyrrole layer was 1 μm. The conductive polymer composite had a surface resistivity of $2.9 \times 10^4$ Ω, a flexural strength of 1010 kgf/cm² and a flexural modulus of 30000 kgf/cm².

Example 13

A 3 mm-thick polymethyl methacrylate-polypyrrole composite was prepared in the same manner as in Example 1 except that 2.3 ml of tetraethylene glycol dimethyl ether was added to the solution and that the electrolytic polymerization was conducted at a voltage of 6.5 V wherein the current density was adjusted to 0.1 mA/cm² at the initial stage and then gradually decreased to reach 0.08 mA/cm² at the final stage.

The thickness of the polypyrrole layer was 1 μm. The conductive polymer composite had a surface resistivity of $1.8 \times 10^5$ Ω, a flexural strength of 1270 kgf/cm² and a flexural modulus of 33100 kgf/cm².

What is claimed is:

1. A method of producing a conductive polymer composite comprising a resin layer and a conductive polymer layer formed on the resin layer, which comprises the steps of dissolving, in a monomer component (a) which polymerizes without condensation reaction, a monomer component (b) which undergoes electrolytic polymerization to give at least one conductive polymer and an electrolyte (c), introducing the resulting solution into an electrolytic polymerization cell having a working electrode and a counter electrode, applying a direct current voltage across the cell to electrolytically polymerize said component (b) to thereby provide the conductive polymer layer on sad working electrode, and thereafter subjecting said component (a) to polymerization in said cell to provide the resin layer.

2. The method as claimed in claim 1 wherein said component (a) is an addition-polymerizable monomer.

3. The method as claimed in claim 2 wherein said addition-polymerizable monomer is at least one member selected from the group consisting of acrylic esters and methacrylic esters, or a mixture comprising more than 50 weight % but less than 100 weight % of at least one member selected from the group consisting of acrylic esters and methacrylic esters and the balance of one or more other addition-polymerizable monomers.

4. The method as claimed in claim 1 wherein said component (b) is at least one member selected from the group consisting of 5-membered heterocyclic compounds and derivatives thereof.

5. The method as claimed in claim 1 wherein said component (b) is a member selected from the group consisting of pyrrole, thiophene, furan, selenophene, tellurophene, isothianaphthene and derivatives of these.

6. The method as claimed in claim 1 wherein said component (b) is at least one member selected from the group consisting of pyrrole and alkyl-substituted pyrroles.

7. The method as claimed in claim 1 wherein said component (b) is at least one aromatic compound selected from the group consisting of benzene, biphenyl, naphthalene, anthracene, azulene, pyrene, carbazole, pyridazine, aniline and derivatives of these.

8. The method as claimed in claim 1 wherein said component (b) is used in an amount effective for controlling thickness and area of the conductive polymer layer.

9. The method as claimed in claim 1 wherein said component (c) is an inorganic ion salt soluble in said component (a).

10. The method as claimed in claim 1 wherein said component (c) is at least one member selected from the group consisting of $LiClO_4$, $LiBF_4$, $LiCF_3SO_3$, $LiPF_6$, $LiAsF_6$ and $AgClO_4$.

11. The method as claimed in claim 1 wherein said component (c) is used in an amount of about 0.0001 to 10 moles per kg of component (a).

12. The method as claimed in claim 1 wherein said solution further contains a solvent for said component (c).

13. The method as claimed in claim 12 wherein said solvent for component (c) is at least one member selected from the group consisting of ethylene glycol dimethyl ether, diethylene glycol dimethyl ether, triethylene glycol dimethyl ether, tetraethylene glycol dimethyl ether, ethylene glycol, diethylene glycol, polyethylene glycol, propylene glycol, polypropylene glycol, propylene carbonate, ethylene carbonate, formamide, dimethylformamide, dimethylacetamide, N-methylpyrrolidone, tetramethylurea, dimethyl sulfoxide, acetonitrile, methanol, ethanol and water.

14. The method as claimed in claim 12 wherein the solvent is used in an amount of 0.001 to 100 parts by weight per 100 parts by weight of said component (a).

15. The method as claimed in claim 1 wherein said electrolytic polymerization cell has a cavity corresponding to a shape of the composite, and can be subjected to heating, cooling or ultraviolet irradiation for the polymerization or curing of said component (a).

16. The method as claimed in claim 1 wherein the voltage applied to the electrodes is about 1 mV to about 100 V.

* * * * *